(12) United States Patent
Bertoldi et al.

(10) Patent No.: US 10,611,118 B2
(45) Date of Patent: Apr. 7, 2020

(54) NEGATIVE POISSON'S RATIO WAFFLE STRUCTURES

(71) Applicants: President and Fellows of Harvard College, Cambridge, MA (US); Siemens Canada Limited, Oakville (CA); Katia Bertoldi, Somerville, MA (US); Matthew Christopher Innes, North Lancaster (CA); Farhad Javid, Somerville, MA (US); Minh Quan Pham, Saint-Laurent (CA); Megan Schaenzer, Montreal (CA); Ali Shanian, Montreal (CA)

(72) Inventors: Katia Bertoldi, Somerville, MA (US); Matthew Christopher Innes, North Lancaster (CA); Farhad Javid, Somerville, MA (US); Minh Quan Pham, Saint-Laurent (CA); Megan Schaenzer, Montreal (CA); Ali Shanian, Montreal (CA)

(73) Assignees: President and Fellows of Harvard College, Cambridge, MA (US); Siemens Canada Limited, Oakville (CA)

( * ) Notice: Subject to any disclaimer, the term of this patent is extended or adjusted under 35 U.S.C. 154(b) by 81 days.

(21) Appl. No.: 15/542,506

(22) PCT Filed: Jan. 9, 2016

(86) PCT No.: PCT/US2016/012767
§ 371 (c)(1),
(2) Date: Jul. 10, 2017

(87) PCT Pub. No.: WO2016/112366
PCT Pub. Date: Jul. 14, 2016

(65) Prior Publication Data
US 2018/0264775 A1    Sep. 20, 2018

Related U.S. Application Data

(60) Provisional application No. 62/118,833, filed on Feb. 20, 2015, provisional application No. 62/101,832, filed on Jan. 9, 2015.

(51) Int. Cl.
*B32B 3/28* (2006.01)
*B32B 15/01* (2006.01)
(Continued)

(52) U.S. Cl.
CPC .............. *B32B 3/28* (2013.01); *B05C 1/00* (2013.01); *B29C 44/56* (2013.01); *B29C 67/20* (2013.01);
(Continued)

(58) Field of Classification Search
CPC ..... Y10T 428/24273; Y10T 428/24281; Y10T 428/24289; Y10T 428/24298;
(Continued)

(56) References Cited

U.S. PATENT DOCUMENTS 662,567 A * 11/1900 Lipowska et al. ..... B21D 13/02
428/604
2,738,297 A    3/1956 Pfistershammer
(Continued)

FOREIGN PATENT DOCUMENTS

DE    3022850 A1 *    1/1982    ............... B32B 3/28
EP    0971172 A1    1/2000
(Continued)

OTHER PUBLICATIONS

Machine translation (Espacenet) of DE 3022850 A1. Translated Feb. 28, 2019. (Year: 2019).*
(Continued)

*Primary Examiner* — Maria V Ewald
*Assistant Examiner* — Ethan A. Utt
(74) *Attorney, Agent, or Firm* — Nixon Peabody LLP

(57) ABSTRACT

In at least some aspects, an auxetic structure includes a first sheet defining therein a plurality of a plurality of structural elements projecting from the first sheet, the plurality of structural elements being arranged to provide a negative
(Continued)

Poisson's ratio, and a second sheet disposed adjacent the first sheet to define a first internal cavity between the first sheet and the second sheet. In yet other aspects, one or more additional sheets may be advantageously provided to provide a multi-layered structure having auxetic properties.

16 Claims, 3 Drawing Sheets

(51) Int. Cl.

| | | |
|---|---|---|
| *B05C 1/00* | (2006.01) | |
| *B31D 3/00* | (2017.01) | |
| *F16S 1/00* | (2006.01) | |
| *B29C 67/20* | (2006.01) | |
| *B32B 7/00* | (2019.01) | |
| *B32B 15/00* | (2006.01) | |
| *B29C 44/56* | (2006.01) | |
| *B32B 7/02* | (2019.01) | |
| *F23R 3/00* | (2006.01) | |

(52) U.S. Cl.
CPC ........... *B31D 3/002* (2013.01); *B32B 7/00* (2013.01); *B32B 7/02* (2013.01); *B32B 15/00* (2013.01); *B32B 15/01* (2013.01); *F16S 1/00* (2013.01); *F23R 3/002* (2013.01); *B32B 2307/724* (2013.01); *B32B 2307/732* (2013.01)

(58) Field of Classification Search
CPC ..... Y10T 428/24306; Y10T 428/24314; Y10T 428/24322; Y10T 428/24331; Y10T 428/24339; Y10T 428/24347; Y10T 428/24628; Y10T 428/24636; Y10T 428/24653; Y10T 428/24661; Y10T 428/24669; Y10T 428/24678; Y10T 428/24645; Y10T 428/25686; Y10T 428/24694; Y10T 428/24702; Y10T 428/24711; Y10T 428/24719; Y10T 428/24727; Y10T 428/24736; Y10T 428/24744; B32B 3/24; B32B 3/266; B32B 3/00; B32B 3/26; B32B 3/28; B32B 3/30; B32B 3/10; B32B 3/12; E04C 2/32; E04C 2/326; E04C 2/34; E04C 2/3405; E04C 2002/3411; E04C 2002/3416; E04C 2002/3422; E04C 2002/3427; E04C 2002/3433; E04C 2002/3438; E04C 2002/3472; E04C 2/00; E04C 2/30; E04C 2/322; E04C 2/324; E04C 2/328; E04C 2/36; E04C 2/365; E04C 2002/3444; E04C 2002/345; E04C 2002/3455; E04C 2002/3461; E04C 2002/3466; E04C 2002/3477; E04C 2002/3483; E04C 2002/3488; E04C 2002/3494
USPC ........ 428/131–140, 174–187, 188; 52/783.1, 52/789.1
See application file for complete search history.

(56) References Cited

U.S. PATENT DOCUMENTS

| | | | | |
|---|---|---|---|---|
| 3,655,501 | A | | 4/1972 | Tesch |
| 4,919,200 | A | * | 4/1990 | Glomski ............... F28D 9/0037 165/166 |
| 5,233,828 | A | | 8/1993 | Napoli |
| 6,223,641 | B1 | | 5/2001 | Kang |
| 6,692,812 | B1 | | 2/2004 | Watanabe |
| 6,926,947 | B1 | * | 8/2005 | Seckel ..................... B32B 1/00 428/174 |
| 7,255,910 | B1 | * | 8/2007 | Seckel ..................... B32B 1/00 428/174 |
| 7,896,222 | B2 | | 3/2011 | Shaw |
| 8,066,482 | B2 | | 11/2011 | Strohl |
| 2005/0039899 | A1 | * | 2/2005 | Brost ....................... F28F 1/40 165/167 |
| 2007/0122590 | A1 | | 5/2007 | Lalvani |
| 2008/0290141 | A1 | | 11/2008 | Shaw |
| 2009/0041978 | A1 | | 2/2009 | Sogard |
| 2009/0117403 | A1 | | 5/2009 | Sutcliffe |
| 2010/0009120 | A1 | | 1/2010 | Boyce |
| 2011/0059291 | A1 | | 3/2011 | Boyce |
| 2011/0081235 | A1 | | 4/2011 | Shah |
| 2011/0265714 | A1 | | 11/2011 | Lee |
| 2012/0021167 | A1 | * | 1/2012 | Plant ....................... B32B 3/12 428/116 |
| 2012/0315456 | A1 | | 12/2012 | Scarpa |
| 2014/0260281 | A1 | | 9/2014 | Limes |
| 2015/0290050 | A1 | * | 10/2015 | Wada ...................... B32B 3/30 428/178 |

FOREIGN PATENT DOCUMENTS

| | | | | |
|---|---|---|---|---|
| GB | 1216990 | A | * 12/1970 | ............... B64C 1/12 |
| GB | 2235200 | A | 2/1991 | |
| GB | 2235650 | A | 3/1991 | |
| KR | 20050100763 | A | * 10/2005 | |
| NL | 7714437 | A | 6/1979 | |
| WO | WO-2014084066 | A1 | * 6/2014 | |
| WO | WO 2014/151045 | A1 | 9/2014 | |
| WO | WO 2014/197059 | A1 | 12/2014 | |
| WO | WO 2016/112366 | A1 | 7/2016 | |

OTHER PUBLICATIONS

Machine translation (KIPRIS) of KR 2005-0100763 A. Translated Feb. 4, 2019. (Year: 2019).*

Li et al.; "Temperature insensitive negative Poisson's ratios in isotropic alloys near a morphotropic phase boundary"; Applied Physics Letters, vol. 101, pp. 251903(1-4); Dec. 19, 2012 retrieved from http://silver.neep.wisc.edu/~lakes/PoissonPhaseAPL12.pdf; (4 pages).

International Search Report and Written Opinion of International Searching Authority for PCT/US2016/012767 dated Mar. 16, 2016 (10 pages).

International Search Report and Written Opinion of International Searching Authority for PCT/US2014/025324 dated Nov. 18, 2014 (6 pages).

International Search Report and Written Opinion of International Searching Authority for PCT/US2014/024830 dated Jul. 10, 2014 (11 pages).

Extended European Search Report for Application No. EP 16735529, dated Jun. 19, 2018 (9 pages).

A. Alderson et al.; "Auxetic materials"; Proceedings of the Institute of Mechanical Engineers, Part G: Journal of Aerospace Enginee, Professional Engineering Publishing Ltd., United Kingdom, vol. 221, No. 4, pp. 565-575; Apr. 1, 2007 (11 pages).

J. Shen et al.; "Simple cubic three-dimensional auxetic metamaterials"; Physica Status Solidi. B., Basic Research, vol. 251, No. 8, pp. 1515-1522; Aug. 14, 2014 (8 pages).

M. Taylor et al.; "Low Porosity Metallic Periodic Structures with Negative Poisson's Ratio"; Advanced Materials, vol. 26, No. 15, pp. 2365-2370; Dec. 23, 2013 (7 pages).

* cited by examiner

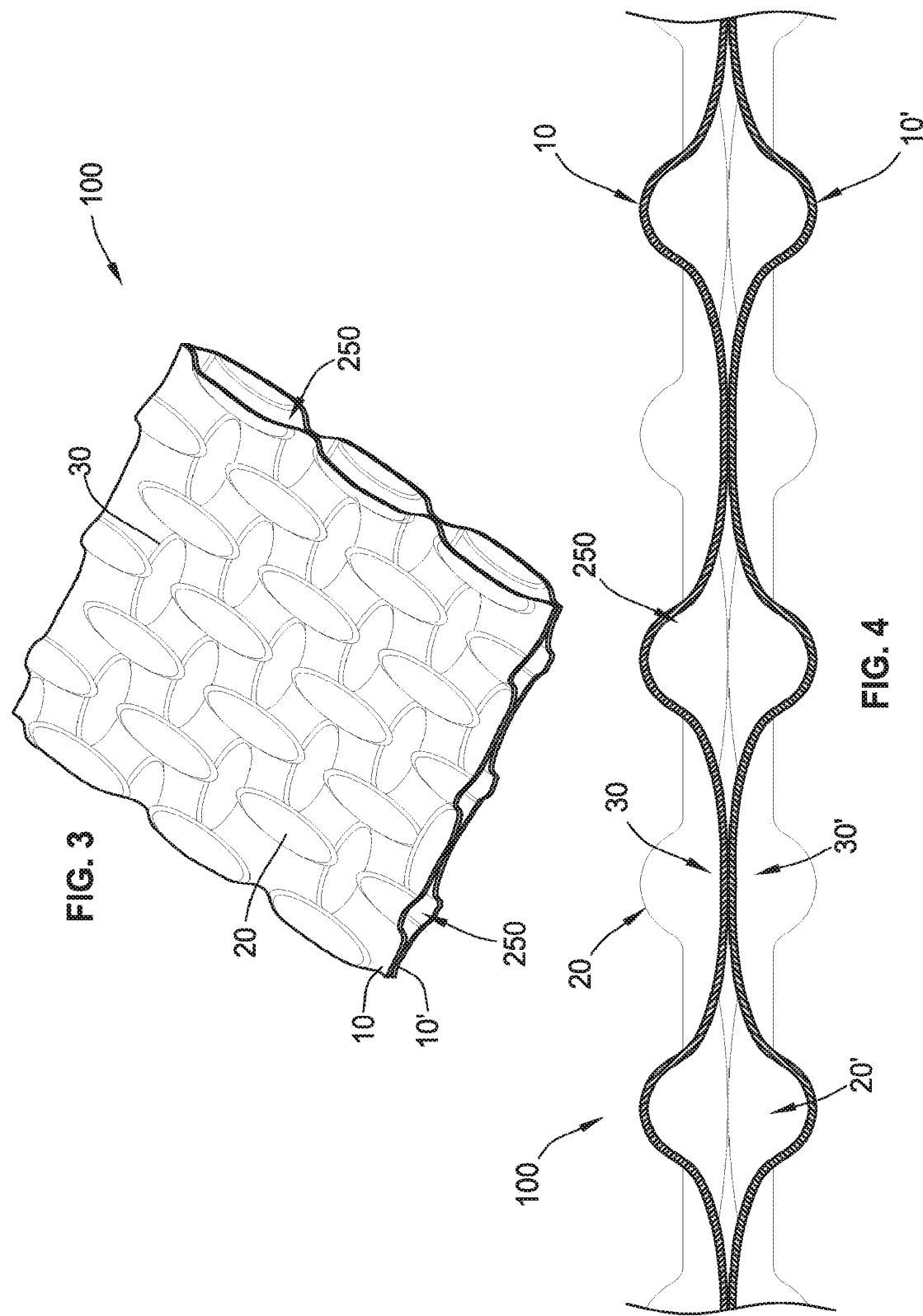

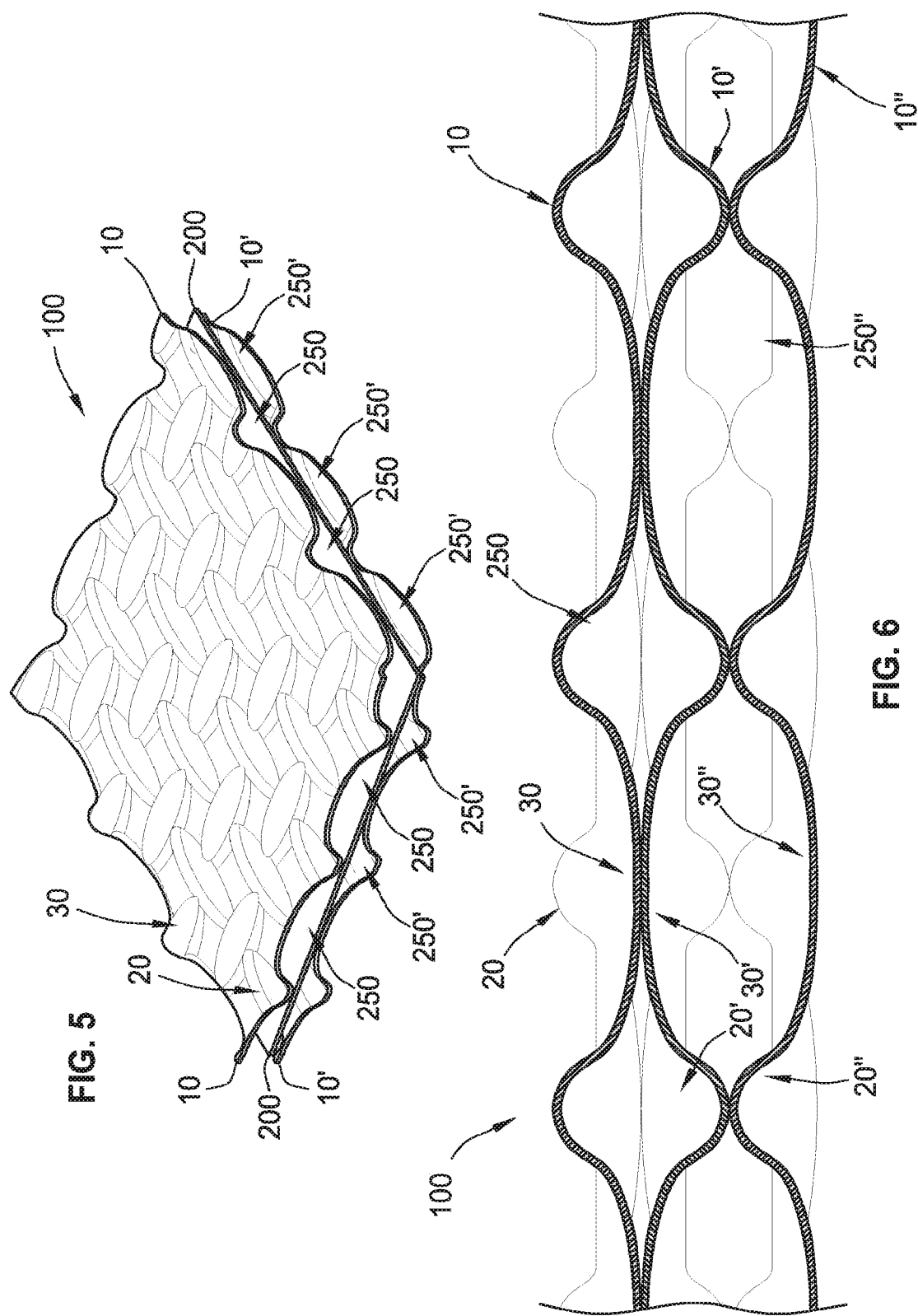

NEGATIVE POISSON'S RATIO WAFFLE STRUCTURES

CROSS-REFERENCE TO RELATED APPLICATIONS

This application is a national stage of International Application No. PCT/US2016/012767, filed Jan. 9, 2016, and titled "Negative Poisson's Ratio Waffle Structures," which claims the benefit of U.S. Provisional Patent Application No. 62/118,833, filed on Feb. 20, 2015, and titled "Negative Poisson Ratio Waffle Structures," and U.S. Provisional Patent Application No. 62/101,832, filed on Jan. 9, 2015, and titled "Waffle Structure," each of which are incorporated herein by reference in their respective entireties.

TECHNICAL FIELD

The present disclosure relates generally to non-porous auxetic structures comprising one or more non-porous auxetic layers, and systems comprising such structures.

BACKGROUND

When materials are compressed along a particular axis, they are most commonly observed to expand in directions transverse to the applied axial load. Conversely, most materials contract along a particular axis when a tensile load is applied along an axis transverse to the axis of contraction. The material property that characterizes this behavior is known as the Poisson's Ratio, which can be defined as the negative of the ratio of transverse/lateral strain to axial/longitudinal strain under axial loading conditions. The majority of materials are characterized by a positive Poisson's Ratio (e.g., about 0.3 for aluminum, brass and steel) and will expand in the transverse direction when compressed in the axial direction and will contract in the transverse direction when stretched in the axial direction. Materials with a negative Poisson's Ratio (NPR), also known as "auxetic" materials, on the other hand, will contract in the transverse direction when compressed in the axial direction and will expand in the transverse direction when stretched in the axial direction.

U.S. Pat. No. 5,233,828 ("'828 Patent"), to Phillip D. Napoli, shows an example of an engineered structural member—a combustor liner—utilized in high temperature applications. Combustor liners are generally used in the combustion section of a gas turbine. Combustor liners can also be used in the exhaust section or in other sections of or components of the gas turbine, such as the turbine blades. In operation, the combustors burn gas at intensely high temperatures up to and surpassing 3,000° F. To prevent this intense heat from damaging the combustor before it exits to a turbine, the combustor liner is provided in the interior of the combustor to insulate the surrounding engine. To minimize temperature and pressure differentials across the combustor liners, cooling slots have conventionally been provided, such as is shown in '828 Patent. The '828 Patent shows a portion of an annular combustor liner having spaced cooling holes disposed in a continuous pattern, angled through the wall of the liner. U.S. Pat. No. 8,066,482 B2, to James Page Strohl et al., shows another example of an engineered structural member having cooling holes shaped to enhance the cooling of a desired region of a gas turbine and to reduce stress levels in and around the cooling holes. European Patent No. EP 0971172 A1, to Dr. Jakob Keller, likewise shows another example of a perforated liner used in a combustion zone of a gas turbine.

In yet another example, U.S. Patent Application Pub. No. 2010/0009120 A1, to Mary C. Boyce et al., discloses a number of transformative periodic structures which include elastomeric or elasto-plastic periodic solids that experience transformation in the structural configuration upon application of a critical macroscopic stress or strain. PCT patent application PCT/US2014/025324, to the President and Fellows of Harvard College, discloses, inter alia, void structures with repeating elongated-aperture patterns providing Negative Poisson's Ratio behavior. PCT patent application PCT/US2014/024830, to the President and Fellows of Harvard College, discloses, inter alia, a solid having an engineered void structure that causes the solid (having a positive Poisson's ratio) to exhibit pseudo-auxetic (NPR) behavior upon application of stress to the solid. The engineered void structure is porous to a degree or fraction which is amenable to, for example, applications involving gas turbine combustors. All of the foregoing patent documents are incorporated herein by reference in their respective entireties for all purposes.

SUMMARY

Aspects of the present disclosure are directed toward generally to non-porous auxetic structures and systems.

In at least some aspects, an auxetic structure includes a first sheet defining therein a plurality of structural elements projecting from the first sheet, the plurality of structural elements being arranged to provide a negative Poisson's ratio, and a second sheet disposed adjacent the first sheet to define a first internal cavity between the first sheet and the second sheet.

According to some aspects of the present concepts, a poly-layer auxetic structure includes a first sheet defining therein a plurality of structural elements projecting from the first sheet, the plurality of structural elements being arranged to provide a negative Poisson's ratio, a second sheet and a third sheet, wherein the second sheet is disposed between the first sheet and the third sheet to define a first internal cavity between the first sheet and the second sheet and to define a second internal cavity between the second sheet and the third sheet, and wherein at least one of the second sheet and the third sheet comprises a plurality of structural elements, the plurality of structural elements being arranged to provide a negative Poisson's ratio.

In accordance with other aspects of the present concepts, a poly-layer auxetic structure includes a first sheet, a second sheet and a third sheet, wherein the second sheet is disposed between the first sheet and the third sheet to define a first internal cavity between the first sheet and the second sheet and to define a second internal cavity between the second sheet and the third sheet and wherein at least one of the first sheet, the second sheet or the third sheet comprise a plurality of structural elements shaped and arranged to produce a negative Poisson's ratio therein.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the

BRIEF DESCRIPTION OF THE DRAWINGS

FIG. 3 shows an isometric view of a composite "waffle" structure comprising two opposing auxetic sheets, such as shown in FIG. 1, disposed adjacent one another in accord with at least some aspects of the present concepts.

FIG. 4 shows a side view of the composite "waffle" structure of FIG. 3.

FIG. 5 shows a first example of a poly-layer composite "waffle" structure comprising a flat sheet disposed between two auxetic sheets in accord with at least some aspects of the present concepts.

FIG. 6 shows a second example of a poly-layer composite "waffle" structure comprising three stacked auxetic sheets in accord with at least some aspects of the present concepts.

Figure 1:
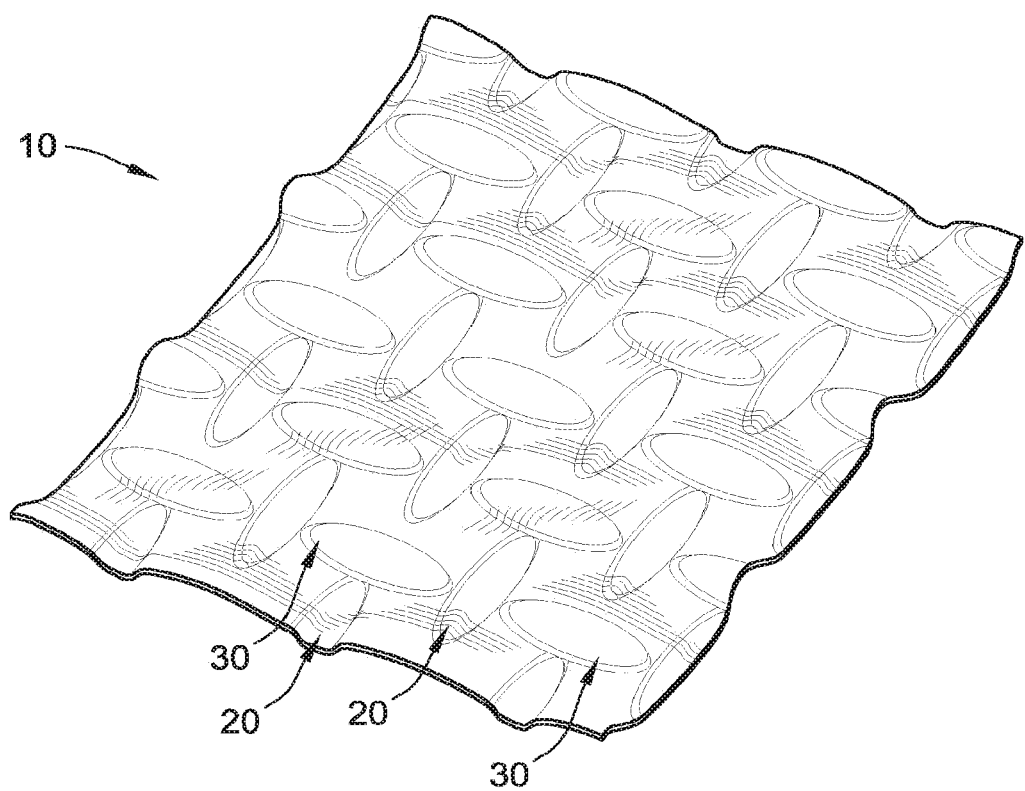
FIG. 1 depicts a non-porous auxetic sheet utilized in accord with at least some aspects of the present concepts.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, combinations, and alternatives falling within the spirit and scope of the invention as defined by the appended claims.

DETAILED DESCRIPTION OF THE ILLUSTRATED EMBODIMENTS

The present concepts are to be understood in the context of auxetic structures, such as are described by way of example in WO 2014/151045 A1 and US 2011/0059291 A1, which are each incorporated by reference in their entirety herein.

This disclosure is susceptible of embodiment in many different forms. There are shown in the drawings, and will herein be described in detail, representative embodiments with the understanding that the present disclosure is to be considered as an exemplification of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed or logically prohibited, the singular includes the plural, and vice versa, and the terms "including," "comprising" and "having" are open-ended. Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Aspects of the present disclosure are directed towards hybrid dimple-and-void auxetic structures which include repeating aperture and protrusion patterns that provide negative Poisson's Ratio (NPR) behavior when macroscopically loaded. Poisson's Ratio is generally typified as the ratio of transverse contraction strain to longitudinal extension strain in a stretched object. Poisson's Ratio is typically positive for most materials, including many alloys, polymers, polymer foams and cellular solids, which become thinner in cross section when stretched. The auxetic structures disclosed herein exhibit a negative Poisson's Ratio behavior.

According to aspects of the disclosed concepts, when the auxetic structure is compressed along one axis (e.g., in the Y direction), coaxial strain results in a moment around the center of each cell because of the way the adjacent apertures are arranged. This, in turn, causes the cells to rotate. Each cell rotates in a direction opposite to that of its immediate neighbors. This rotation results in a reduction in the transverse axis (X-direction) distance between horizontally adjacent cells. In other words, compressing the structure in the Y direction causes it to contract in the X direction. Conversely, tension in the Y direction results in expansion in the X direction. At the scale of the entire structure, this mimics the behavior of an auxetic material. But many of the structures disclosed herein are composed of conventional materials. Thus, the unadulterated material itself may have a positive Poisson's Ratio, but by modifying the structure with the introduction of the aperture patterns and combinations disclosed herein, the structure behaves, locally and/or globally, as having a negative Poisson's Ratio.

Contrary to the type of NPR structure disclosed in, for example, those described in WO 2014/151045 A1 and US 2011/0059291 A1, incorporated herein by reference in their respective entireties for all purposes, the NPR structures disclosed herein have no porosity.

FIG. 1 shows an isometric view of a structure 10 (e.g., a sheet material, etc.) patterned with a first plurality of structural elements 20 (e.g., "dimples") configured to exit a plane of the structure in a first direction (e.g., normal to the plane of the sheet, etc.) and a second plurality of structural elements 30 configured to exit a plane of the structure in a second direction (e.g., normal to the plane of the sheet in a direction opposite to the first direction, etc.). As an illustration, the first plurality of structural elements 20 may comprise convex structures exiting a plane of the structure in a first direction normal to the plane of the sheet and the second plurality of structural elements 30 may comprise convex structures configured to exit a plane of the structure in a second direction normal to the plane of the sheet (i.e., opposite to the first direction).

In various aspects, the structure 10 comprises a metal, aluminum, steel, and/or an alloy, as appropriate for a particular application such as, but not limited to, a gas turbine combustor liner, a heat exchanger element, or a boiler. By way of example, in certain high temperature applications, a suitable material may comprise, but is not limited to, a "superalloy" such as a nickel-based superalloy (e.g., Inconel (e.g. IN100, IN600, IN713), Waspaloy, Rene alloys (e.g. Rene 41, Rene 80, Rene 95, Rene N5), Haynes alloys, Incoloy, MP98T, TMS alloys, and CMSX (e.g. CMSX-4) single crystal alloys, etc.).

The structural elements 20, 30 transform the underlying structure 10 from a Positive Poisson's Ratio (PPR) to a Negative Poisson's Ratio (NPR) responsive to stresses acting along a plane of the structure. As shown in FIG. 1, the major axes of the first structural elements 20 and the second structural elements 30 are shown to be orthogonal to one another and the first structural elements 20 and the second structural elements 30 are disposed in an alternating relationship. This arrangement is non-limiting and the present concepts expressly including any tiling arrangement of one or more structural elements, as disclosed herein, that provide a Negative Poisson's Ratio (NPR).

In the example shown in FIG. 1, the structural elements 20, 30 are shown with arbitrarily chosen cross-sections, depth, and out-of-plane profiles for purposes of illustration and these parameters may be varied in accord with various aspects of the present concepts. Specifically, while the illustrated examples show uniformity in the structural elements 20, 30, the present concepts expressly include utilization of different structural elements (e.g., spheroidal or ellipsoidal caps) projecting from one side or both sides of the sheet or structure 10. The structural elements could comprise, for example, entirely elliptical structural elements a combination of different structural elements, such as a combination of spherical cap structural elements and elliptical structural elements. For any of these structural elements, the structural element can vary in depth, aspect ratio, and steepness of incline, among other design variables.

The structural elements 20, 30, however, could comprise different shapes than that shown in the exemplary figures and need not necessary be dimensionally similar to one another (e.g., a shape of structural element 20 can be different than a shape of structural element 30). Further, the arrangement of the structural elements 20, 30, need not be as shown and the arrangement may differ from that shown (e.g., greater spacing between structural elements 20, 30 or different angular relationships between structural elements 20, 30). It is to be noted that the tiling patterns are not required to necessarily provide a global NPR behavior and instead may be configured to provide a local NPR behavior, such as to advantageously provide special patterns of shrinkage or expansion in the displacement field of the structure. The structural elements 20, 30, shown as elliptical "dimples," are not restricted to ellipsoidal structures (e.g., they may comprise spherical caps), and can vary in depth, aspect ratio, and steepness of incline, among other features. Thus, the cross-section, depth and/or out-of-plane structural element 20, 30 profiles can vary significantly in accord with the present concepts.

In at least some aspects, the structure 10 bearing the structural elements 20, 30 is a thin-walled or thin-shell structure where the thickness of the material is about ten times less than the lateral dimensions and such relative dimensions facilitate realization of NPR behavior. Additionally, in at least some aspects, the radius of the structural element (e.g., spherical cap) cross-section or half of the minor axis of an elliptical element is less than about ten times that of the structure thickness to facilitate realization of NPR behavior. Yet further, in at least some aspects, the cross-sectional area of the structural elements 20, 30 cover a large area of the structure 10 (e.g., more than about 40%, more than about 50%, etc.) to facilitate realization of NPR behavior. Where spherical structural elements (e.g., spherical caps) are provided, in some aspects the depth of the spherical structural element is around half that of the radius of the spherical structural element so as to facilitate realization of NPR behavior.

As noted above, the structural elements 20, 30 can assume a variety of shapes (including a plurality of shapes for a given material or sub-portion of a material) and can be optimized to impart desired mechanical properties to the material or sub-portion thereof. In at least some aspects, the structural element 20, 30 profiles are defined by the following function:

$$z = f(x, y) = \exp\left(\delta\left[1 - \frac{1}{1 - \left|\frac{x}{a}\right|^\alpha - \left|\frac{y}{b}\right|^\beta}\right]\right)$$

Restricted to:

$$\left|\frac{x}{a}\right|^\alpha + \left|\frac{y}{b}\right|^\beta < 1$$

The generated structural element is then tiled on a structure (e.g., sheet metal, etc.) to achieve a structural element providing both a NPR and other characteristics appropriate for the application (e.g., heat transfer surface area, etc.). In the function presented above, a and b control the aspect ratio of the ellipsoid in the f(x,y)=0 plane, $\delta$ shows the structural element's 20, 30 (e.g., dimple's) maximum depth, and $\alpha$, $\beta$ vary the out-of-plane curvature.

A pseudo-porosity for structural elements can be defined as the ratio between the combined structural element's cross-sectional area ($A_{SE}$) and the area ($A_S$) of the entire structure (i.e., Pseudo-porosity=$A_{SE}/A_S$). In a local area (e.g., a unit cell), the pseudo-porosity can be understood as the ratio between the area of one of the structural elements 20, 30 and that of an imaginary geometric element (e.g., rectangle or square) surrounding it.

One advantage provided by the structure 10 is a zero-porosity and low stress values exhibited under displacement-controlled loading, by virtue of, inter alfa, local and/or global NPR behavior. Since the disclosed NPR structures are non-porous and permit no fluids to pass, they present an excellent candidate for utilization in any structure for which porosity would be disadvantageous such as, but not limited to, turbine components, heat exchangers, boilers, or any other structure or component subjected to mechanical and/or thermal loading.

Figure 2:
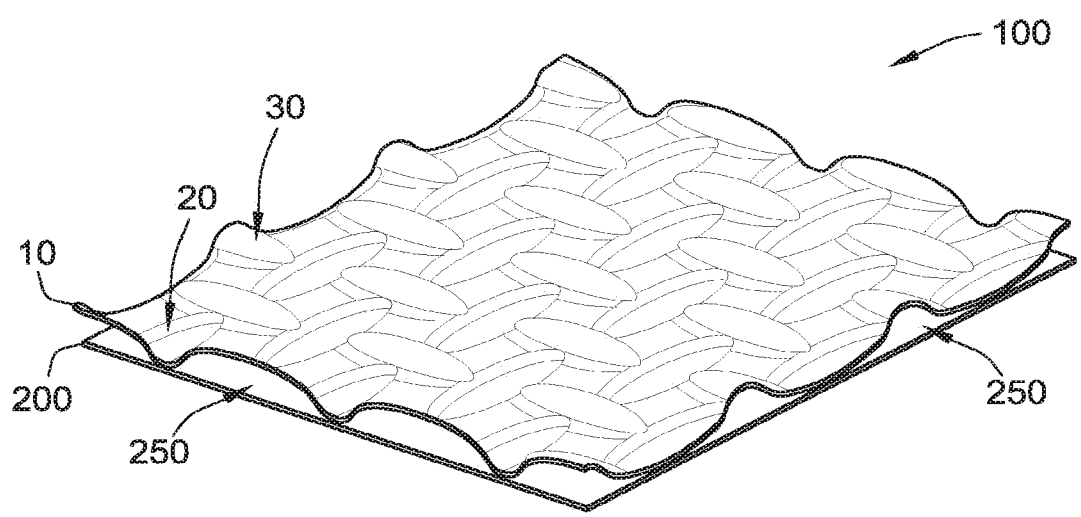
FIG. 2 shows a composite "waffle" structure comprising an auxetic sheet, such as shown in FIG. 1, disposed adjacent a flat sheet in accord with at least some aspects of the present concepts.

The shape(s) and/or distribution(s) of the structural elements 20, 30 over the structure(s) 10, or over the structures 100 in FIGS. 2-4, may be varied to provide a desired local auxetic behavior, such as to accommodate optimization for a complex structure and/or application where different behaviors are required in different sections of a structure. For example, a particular structure 100 (e.g., a gas turbine combustor liner, etc.) may comprise a first portion having a first arrangement of structural elements 20, 30 (e.g., shape(s), depth(s), etc.), a second portion having a second arrangement of structural elements 20, 30 and a third portion having a third arrangement of structural elements 20, 30. In general, the structures 10, 100 show very low stress values under displacement-controlled cases and demonstrate relatively high structural stiffness, making them very good candidates for use in both load- and displacement-controlled loading conditions.

In particular, the structure 100 in FIGS. 2-4 defines a space or internal cavity 250 between the opposing structures 10, 200 (FIG. 2) and 10, 10' (FIGS. 3-4). This space 250 is particularly advantageous for use in applications such as boilers or heat exchangers wherein enhancements to cooling can be achieved by flowing a cooling fluid through the space. It is to be noted, however, that the present concepts likewise extend to structures 100 and applications in which a heating fluid is passed through the space 250. The effectiveness of the heat transfer across structure 100 is further enhanced by utilization of the structural elements 20, 30, to increase a surface area of the structure 10. Moreover, the undulating structure of the structural elements 20, 20', 30 and 30' depicted in the configuration of FIGS. 3-4 maximizes the surface area of the entire structure 100 and, consequently, the heat transfer therefrom and thereacross.

Moreover, the disclosed structures 100 may comprise more than two sheets or structures 10, 10', 200 forming a poly-layer structure comprising, by way of example, three, four or five or more layers, such as is represented in FIGS. 5-6. FIG. 5 shows an example of a poly-layer composite structure 100 comprising a flat sheet 200 disposed between two auxetic sheets 10, 10' in accord with at least some aspects of the present concepts. FIG. 6 shows an example of a poly-layer composite structure 100 comprising three stacked auxetic sheets 10, 10', 10" in accord with at least some aspects of the present concepts.

The structures 100 in the examples of FIGS. 2-6 are more broadly defined simply as a poly-layer structure comprising two or more (e.g., 3, 4, 5, etc.) layers or sheets. The poly-layer structure 100 is formed from combinations of one or more non-porous structures 10, 10', 200 and optionally one or more porous structures (i.e., structures having voids or through holes therein), such as those described in WO 2014/151045 A1 or US 2011/0059291 A1, incorporated herein by reference in their respective entireties for all purposes. Thus, in accord with at least some aspects of the present concepts, a poly-layer structure 100 is formed from combinations of plain sheet(s) (see, e.g., structure 200 in FIG. 2), patterned sheet(s) (see, e.g., patterned structure 10 in FIG. 2) and/or void-patterned sheet(s), defining one or more spaces 250, 250' therebetween, to achieve a desired combination of structural performance and cooling performance.

In the structures 100 represented in FIGS. 2-6, the structural elements 20, 30 (and 20', 30') increase turbulent flow and enhance the heat transfer coefficient, providing a significant advantage wherever internal cooling (or heating) is required to regulate component temperature. In addition, the utilization of the structural elements 20, 30 (and/or 20', 30') in such a manner as to impart auxetic behavior in the associated structure 10 (and/or 10') under loading causes such structures to exhibit lower stresses than that of a conventional porous sheet when under thermal strain. As one example, the structures 100 in FIGS. 2-6 may be utilized in a combustor liner and cooling fluid (e.g., air) is passed through the spaces (e.g., 250) between the structures (e.g., 10, 10', etc.) to enhance the removal of heat from the combustor liner. Particularly where the combustor liner utilizes structures 100 comprising one or more "dimpled" sheets (e.g., 10, 10') bearing the structural elements 20, 30 and the like, the structural elements provide an increased surface area and enhance mechanical response over that of a flat or substantially featureless structure and render the structure 100 capable of sustaining higher flame temperatures without failure.

In yet another example, a structure 100 such as is disclosed in FIGS. 2-6 is utilized in a turbine blade or vane, with one or more surfaces in contact with an external working fluid and, optionally, an internal working fluid circulating through spaces (e.g., 250) of the structure. Such structure 100 comprises one or more "dimpled" sheets (e.g., 10, 10') bearing structural elements 20, 30 and the like (externally and/or internally) to enhance heat transfer and minimize the creation of stress risers.

The sheets or structures (e.g., 10, 10', etc.) used to form the structure 100 may comprise metals or alloys such as, but not limited to, a sheet steel or Inconel as appropriate for a particular application, subjected to a conventional forming process (e.g., drawing, stamping, pressing, coining, embossing, or the like, any of which may be performed in one step or progressively in a plurality of steps) to form the structural elements (e.g., 20, 20', 30, 30', etc.). For sheets or structures having voids or openings (not shown), the process for forming the voids or openings may comprise a conventional forming process (e.g., punching, laser cutting, punch laser, drilling, water jet cutting, etc.) to form the openings. In yet other aspects, the structural elements (e.g., 20, 20', 30, 30', or openings (not shown), etc.) may be produced via a casting process such as, but not limited to, an investment casting (lost-wax casting), lost-foam casting, sand-casting, ceramic mold casting, hybrid ceramic-sand core casting, full-mold casting, evaporative-pattern casting, or the like.

In some aspects, the sheets or structures (e.g., 10, 10', etc.) are formed as separate units, which are then aligned, assembled and joined to form the structure 100.

In other aspects, the sheets or structures (e.g., 10, 10', etc.) are formed as an integral whole. By way of example, a hollow cast blade or vane structure 100 comprises structural elements as defined herein (e.g., dimples 20, 20', 30, 30', or openings, etc.) in internal cooling passages thereof, the structure and constituent structural elements being formed by a conventional casting process such as, but not limited to, a ceramic core manufacturing process or other complex casting process.

The present invention is not limited to the precise construction and compositions disclosed herein. Rather, any and all modifications, changes, and variations apparent from the foregoing descriptions are within the scope and spirit of the invention as defined in the appended claims. Moreover, the present concepts expressly include any and all combinations and sub-combinations of the preceding elements and aspects.

What is claimed is:

1. An auxetic structure comprising:
   a first sheet defining therein a first plurality of structural elements and a second plurality of structural elements, the first plurality of structural elements projecting from the first sheet in the form of convex dimples, the second plurality of structural elements projecting from the first sheet in the form of concave dimples, the first plurality of structural elements being disposed in an alternating relationship relative to the second plurality of structural elements, the first plurality of structural elements and the second plurality of structural elements being non-porous with a zero-porosity that prevents fluids from passing through the first plurality of structural elements and the second plurality of structural elements; and
   a second sheet disposed adjacent the first sheet to define a first internal cavity between the first sheet and the second sheet,
   wherein the first plurality of structural elements and the second plurality of structural elements provide a Negative Poisson's Ratio (NPR) along a plane of the first sheet,
   wherein the first sheet is a thin-wall or thin-shell structure having a thickness that is about ten times less than lateral dimensions, and
   wherein each structural element of the first plurality of structural elements and the second plurality of structural elements has a cross-sectional radius projecting from the plane of the first sheet and a major axis that is longer than a minor axis along the plane of the first sheet, the cross-sectional radius or half of the minor axis being less than about ten times that of the thickness.

2. The auxetic structure of claim 1, wherein the second sheet is at least substantially flat.

3. The auxetic structure of claim 2, further comprising:
a third sheet disposed adjacent the second sheet to define a second internal cavity between the third sheet and the second sheet.

4. The auxetic structure of claim 3, wherein the second sheet comprises a plurality of openings therein to permit flow between the first internal cavity and the second internal cavity.

5. The auxetic structure of claim 1, wherein the second sheet defines a third plurality of structural elements projecting from the second sheet in the form of convex dimples and a fourth plurality of structural elements projecting from the second sheet in the form of concave dimples.

6. The auxetic structure of claim 5, wherein the third plurality of structural elements and the fourth plurality of structural elements of the second sheet are in the form of ellipsoidal caps.

7. The auxetic structure of claim 5, wherein the first plurality of structural elements of the first sheet are aligned with corresponding ones of the third plurality of structural elements of the second sheet such that corresponding ones of the convex dimples are adjacent each other, the second plurality of structural elements of the first sheet being aligned with corresponding ones of the fourth plurality of structural elements of the second sheet such that corresponding ones of the concave dimples are adjacent each other.

8. The auxetic structure of claim 1, wherein the first plurality of structural elements and the second plurality of structural elements of the first sheet are in the form of ellipsoidal caps.

9. A poly-layer auxetic structure, comprising:
a first sheet defining therein a first plurality of structural elements and a second plurality of structural elements, the first plurality of structural elements projecting from the first sheet in the form of convex dimples, the second plurality of structural elements projecting from the first sheet in the form of concave dimples, the first plurality of structural elements being disposed in an alternating relationship relative to the second plurality of structural elements, the first plurality of structural elements and the second plurality of structural elements being non-porous with a zero-porosity that prevents fluids from passing through the first plurality of structural elements and the second plurality of structural elements;
a second sheet; and
a third sheet,
wherein the second sheet is disposed between the first sheet and the third sheet to define a first internal cavity between the first sheet and the second sheet and to define a second internal cavity between the second sheet and the third sheet, and
wherein at least one of the second sheet and the third sheet comprises a third plurality of structural elements,
wherein the first plurality of structural elements and the second plurality of structural elements provide a Negative Poisson's Ratio (NPR) along a plane of the first sheet,
wherein the first sheet is a thin-wall or thin-shell structure having a thickness that is about ten times less than lateral dimensions, and
wherein each structural element of the first plurality of structural elements and the second plurality of structural elements has a cross-sectional radius projecting from the plane of the first sheet and a major axis that is longer than a minor axis along the plane of the first sheet, the cross-sectional radius or half of the minor axis being less than about ten times that of the thickness.

10. The poly-layer auxetic structure according to claim 9, wherein the first plurality of structural elements and the second plurality of structural elements of the first sheet are in the form of ellipsoidal caps.

11. The poly-layer auxetic structure according to claim 9, wherein the third plurality of structural elements of the at least one of the second sheet and the third sheet is in the form of ellipsoidal caps.

12. The poly-layer auxetic structure according to claim 9, wherein the third plurality of structural elements of the at least one of the second sheet and the third sheet is in the form of openings.

13. The poly-layer auxetic structure according to claim 9, wherein each of the second sheet and the third sheet comprises the third plurality of structural elements.

14. A poly-layer auxetic structure, comprising:
a first sheet defining therein a first plurality of structural elements and a second plurality of structural elements, the first plurality of structural elements projecting from the first sheet in the form of convex dimples, the second plurality of structural elements projecting from the first sheet in the form of concave dimples, the first plurality of structural elements being disposed in an alternating relationship relative to the second plurality of structural elements, the first plurality of structural elements and the second plurality of structural elements being non-porous with a zero-porosity that prevents fluids from passing through the first plurality of structural elements and the second plurality of structural elements;
a second sheet; and
a third sheet,
wherein the second sheet is disposed between the first sheet and the third sheet to define a first internal cavity between the first sheet and the second sheet and to define a second internal cavity between the second sheet and the third sheet,
wherein the first plurality of structural elements and the second plurality of structural elements provide a Negative Poisson's Ratio (NPR) along a plane of the first sheet,
wherein the first sheet is a thin-wall or thin-shell structure having a thickness that is about ten times less than lateral dimensions, and
wherein each structural element of the first plurality of structural elements and the second plurality of structural elements has a cross-sectional radius projecting from the plane of the first sheet and a major axis that is longer than a minor axis along the plane of the first sheet, the cross-sectional radius or half of the minor axis being less than about ten times that of the thickness.

15. The poly-layer auxetic structure according to claim 14, wherein at least one of the first plurality of structural elements and the second plurality of second elements is in the form of ellipsoidal caps.

16. The poly-layer auxetic structure according to claim 14, wherein at least one of the second sheet and the third sheet includes a third plurality of structural elements with openings therein.

* * * * *